(12) United States Patent
Christopher

(10) Patent No.: US 12,134,152 B2
(45) Date of Patent: *Nov. 5, 2024

(54) WELDING WIRE FEEDER WITH TONGUE AND GROOVE FEATURE

(71) Applicant: ILLINOIS TOOL WORKS INC., Glenview, IL (US)

(72) Inventor: Mark Richard Christopher, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 500 days.

This patent is subject to a terminal disclaimer.

(21) Appl. No.: 16/401,689

(22) Filed: May 2, 2019

(65) Prior Publication Data

US 2019/0255643 A1 Aug. 22, 2019

Related U.S. Application Data

(63) Continuation of application No. 13/315,054, filed on Dec. 8, 2011, now Pat. No. 10,315,269.

(Continued)

(51) Int. Cl.
*B23K 9/133* (2006.01)
*B23K 9/32* (2006.01)
(Continued)

(52) U.S. Cl.
CPC .............. *B23K 9/1336* (2013.01); *B23K 9/32* (2013.01); *B65H 51/10* (2013.01); *B65H 57/12* (2013.01)

(58) Field of Classification Search
CPC . B23K 9/00; B23K 9/12; B23K 9/133; B23K 9/1336; B23K 9/32; B23K 9/124; B23K 9/173

(Continued)

(56) References Cited

U.S. PATENT DOCUMENTS 2,767,302 A 10/1956 Brashear, Jr.
3,107,291 A 10/1963 Evans
(Continued)

FOREIGN PATENT DOCUMENTS

GB 1125440 A 8/1968
JP 2000079475 3/2000
(Continued)

OTHER PUBLICATIONS

Minato, JP 2003001421 A (Year: 2003).*

(Continued)

*Primary Examiner* — Vy T Nguyen
(74) *Attorney, Agent, or Firm* — McAndrews, Held & Malloy, Ltd.

(57) ABSTRACT

A welding wire feeder including an alignment tongue and groove connection between a clamp arm and a welding drive assembly housing is provided. In certain embodiments, an alignment tongue extends from an end of the clamp arm opposite a pivot point about which the clamp arm rotates relative the assembly housing. A corresponding alignment groove may be formed in the assembly housing to receive the alignment tongue when the clamp arm is rotated such that a drive wheel mounted on the clamp arm contacts a drive wheel mounted on the assembly housing. In addition, a tensioner may be pivoted into a groove in the clamp arm to transfer a compressive force through the clamp arm, forcing the drive wheels together. The alignment tongue and groove may reduce lateral displacement of the clamp arm relative to the assembly housing that may be caused by a force transferred to the clamp arm as the tensioner is pivoted.

20 Claims, 3 Drawing Sheets

Related U.S. Application Data

(60) Provisional application No. 61/423,849, filed on Dec. 16, 2010.

(51) Int. Cl.
  *B65H 51/10* (2006.01)
  *B65H 57/12* (2006.01)

(58) Field of Classification Search
  USPC .......................................................... 219/136
  See application file for complete search history.

(56) References Cited

U.S. PATENT DOCUMENTS

| | | | |
|---|---|---|---|
| 3,248,516 A | 4/1966 | Gilliland | |
| 3,309,497 A | 3/1967 | Kensrue | |
| 3,331,545 A | 7/1967 | Olivieri | |
| 3,382,398 A | 5/1968 | Austin | |
| 3,391,844 A * | 7/1968 | Bell | B23K 9/122 |
| | | | 228/41 |
| 3,430,832 A | 3/1969 | Meyer | |
| 3,570,325 A | 3/1971 | Kroll | |
| 3,576,966 A * | 5/1971 | Sullivan | B23K 9/24 |
| | | | 219/137 R |
| 3,675,837 A | 7/1972 | Gerould | |
| 3,718,798 A | 2/1973 | Randolph | |
| 4,083,079 A | 4/1978 | Vermillion | |
| 5,223,671 A | 6/1993 | Alfieri | |
| 5,743,140 A | 4/1998 | Gustafson | |
| 5,816,466 A | 10/1998 | Seufer | |
| 5,918,195 A | 6/1999 | Halgrimson | |
| 6,137,057 A | 10/2000 | Gutgsell | |
| 6,356,045 B1 | 3/2002 | Newton | |
| 6,388,234 B1 | 5/2002 | Collins | |
| 6,427,894 B1 | 8/2002 | Blank | |
| 6,479,795 B1 | 11/2002 | Albrecht | |
| 6,568,578 B1 * | 5/2003 | Kensrue | B23K 9/1336 |
| | | | 219/137.7 |
| 6,658,960 B2 | 12/2003 | Babin | |
| 6,868,590 B2 | 3/2005 | Bentrim | |
| 6,903,305 B2 | 6/2005 | Mukai | |
| 6,979,785 B2 | 12/2005 | Yamasaki | |
| 7,026,574 B2 | 4/2006 | Belfiore | |
| 7,124,697 B2 | 10/2006 | Foley | |
| 7,238,918 B2 | 7/2007 | Matiash | |
| 7,374,074 B2 | 5/2008 | Matiash | |
| 7,415,791 B2 | 8/2008 | Williams, III | |
| 7,427,726 B2 | 9/2008 | Enyedy | |
| 7,441,682 B2 | 10/2008 | Kerekes | |
| 7,520,720 B2 | 4/2009 | Welch | |
| 7,531,768 B2 | 5/2009 | Matiash | |
| 7,615,718 B2 | 11/2009 | Byerly | |
| 7,687,742 B2 | 3/2010 | Belfiore | |
| 7,692,117 B2 | 4/2010 | Belfiore | |
| 7,767,934 B2 | 8/2010 | Christopher | |
| 7,977,604 B2 | 7/2011 | Ertmer | |
| 8,276,307 B2 * | 10/2012 | Deros | F41G 11/003 |
| | | | 42/127 |
| 8,450,647 B2 | 5/2013 | Leiteritz | |
| 2004/0016736 A1 | 1/2004 | Huismann | |
| 2004/0104614 A1 | 6/2004 | Higley | |
| 2005/0016976 A1 | 1/2005 | Belfiore | |
| 2005/0040202 A1 | 2/2005 | Kerekes | |
| 2005/0224484 A1 | 10/2005 | Matiash | |
| 2005/0224550 A1 | 10/2005 | Matiash | |
| 2006/0138114 A1 | 6/2006 | Belfiore | |
| 2007/0108172 A1 | 5/2007 | Belfiore | |
| 2008/0035625 A1 | 2/2008 | Ertmer | |
| 2008/0035626 A1 | 2/2008 | Christopher | |
| 2008/0296278 A1 | 12/2008 | Meckler | |
| 2009/0242535 A1 | 10/2009 | Minato | |
| 2009/0277890 A1 | 11/2009 | Leiteritz | |
| 2010/0133788 A1 | 6/2010 | Cunningham | |
| 2012/0125905 A1 | 5/2012 | Anzengruber | |
| 2012/0152926 A1 | 6/2012 | Matiash | |
| 2012/0186689 A1 | 7/2012 | Burns | |
| 2012/0298082 A1 | 11/2012 | Agemura | |

FOREIGN PATENT DOCUMENTS

| | | |
|---|---|---|
| JP | 2003001421 A | 1/2003 |
| WO | 0003295 A1 | 1/2000 |
| WO | 02096234 A1 | 12/2002 |

OTHER PUBLICATIONS

International Search Report from PCT application No. PCT/US2011/064716 dated Apr. 4, 2012, 11 pgs.

International Search Report from PCT application No. PCT/US2012/030828 dated Jul. 16, 2012, 10 pgs.

* cited by examiner

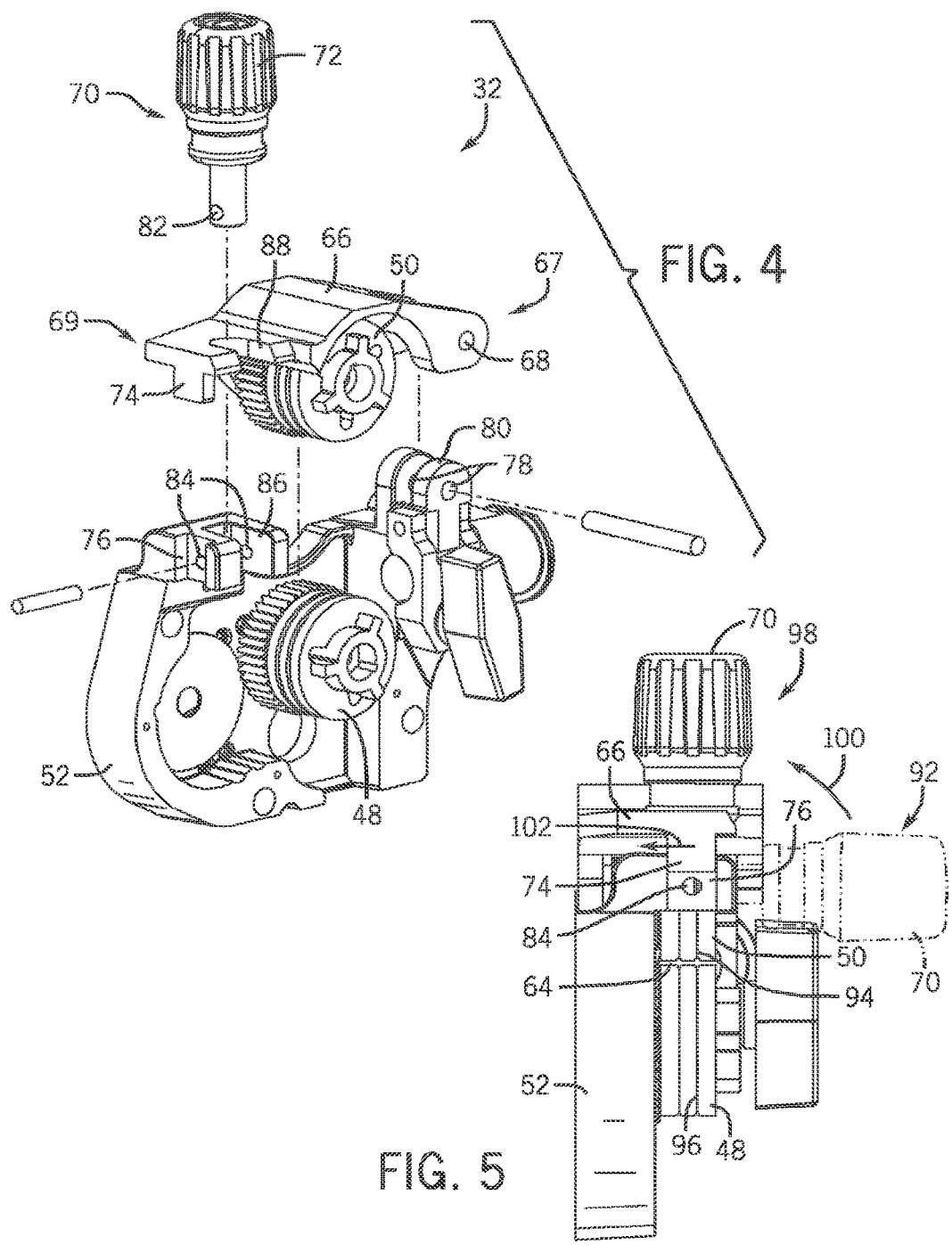

WELDING WIRE FEEDER WITH TONGUE AND GROOVE FEATURE

CROSS REFERENCE TO RELATED APPLICATIONS

The present application is a continuation of U.S. Non-Provisional patent application Ser. No. 13/315,054, entitled "Welding Wire Feeder With Tongue and Groove Feature," filed Dec. 8, 2011, which claims priority to U.S. Provisional Patent Application No. 61/423,849, entitled "Tongue and Groove Clamp Arm," filed Dec. 16, 2010, both of which are hereby expressly incorporated by reference in their entirety.

BACKGROUND

The invention relates generally to welding systems, and, more particularly, to a tongue and groove feature for maintaining alignment of drive wheels in a welding wire feeder.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at a desired time. For example, metal inert gas (MIG) welding typically relies on a wire feeder to ensure a proper wire feed reaches a welding torch.

Such wire feeders facilitate the feeding of welding wire from a wire spool, through a pair of drive wheels, to the welding torch at a desired wire feed rate. The mechanical components of the wire feeder are generally aligned in order to maintain proper alignment of the welding wire feeding between the drive wheels. However, forces applied by a welding operator to certain wire feeder components occasionally lead to misalignment of the components and, consequently, the welding wire.

BRIEF DESCRIPTION

In an exemplary embodiment, a welding wire feeder includes a first drive wheel and a second drive wheel, both configured to rotate with respect to a welding drive assembly housing. The welding wire feeder also includes a clamp arm configured to pivot at a first end of the clamp arm about a clamp arm joint of the welding drive assembly housing. The first and second drive wheels are disposed opposite from one another about a welding wire feed region, and the clamp arm is configured to transfer a compressive force from the first drive wheel to welding wire fed through the welding wire feed region. The clamp arm includes an alignment tongue extending from a second end of the clamp arm that is opposite the first end, and the welding drive assembly housing includes an alignment groove configured to receive the alignment tongue of the clamp arm.

In another embodiment, a welding system includes a welding wire spool and a welding drive assembly housing configured to feed welding wire from the welding wire spool through a welding wire feed region of the welding drive assembly housing. Additionally, the welding system includes a first drive wheel and a second drive wheel, each configured to rotate with respect to the welding drive assembly housing. The welding system also includes a clamp arm configured to pivot at a first end of the clamp arm about a clamp arm joint of the welding drive assembly housing. The first and second drive wheel are disposed opposite from one another about the welding wire feed region, and the clamp arm is configured to transfer a compressive force from the first drive wheel to welding wire fed through the welding wire feed region. The clamp arm includes an alignment tongue extending from a second end of the clamp arm that is opposite the first end, and the welding drive assembly housing includes an alignment groove configured to receive the alignment tongue of the clamp arm.

In a further embodiment, a method includes rotating a clamp arm of a welding wire feeder about a clamp arm joint of a housing of the welding wire feeder such that a first drive wheel mounted on the clamp arm contacts a second drive wheel mounted on the housing, and an alignment tongue extending from an end of the clamp arm opposite the clamp arm joint is disposed within an alignment groove in the housing. The method also includes pivoting a tensioner into a tensioner groove in the clamp arm and adjusting an adjustment knob of the tensioner to apply a compressive force to the clamp arm and the first drive wheel.

DRAWINGS

These and other features, aspects, and advantages of the present invention will become better understood when the following detailed description is read with reference to the accompanying drawings in which like characters represent like parts throughout the drawings, wherein:

FIG. 4 is an exploded perspective view of an embodiment of the drive assembly having a clamp arm with an alignment tongue and an assembly housing with an alignment groove; and FIG. 5 is a side view of an embodiment of the drive assembly showing a tensioner pivoting into engagement with the clamp arm.

DETAILED DESCRIPTION

Present embodiments are directed to a welding wire feeder with an improved alignment tongue and groove feature. In typical wire feeders, welding wire is aligned between grooves formed along the circumference of a pair of drive wheels, and a pivoting arm coupled to one drive wheel positions the drive wheel against the wire. A pivoting structure (tensioner) is used to apply a clamping force to the pivoting arm, securing the wire between the drive wheel grooves. The tensioner is typically configured to pivot in the plane of the spool, and a longer tensioner may offer greater mechanical advantage to the user when applying the clamping force. However, certain portable wire feeders include such compact arrangements of the wire feeder components that a long tensioner could contact the spool when pivoted, potentially limiting the range of motion of the tensioner as it disengages the clamp arm. The tensioner may instead be oriented to pivot in another plane, but this could apply an undesirable force to the clamp arm when the tensioner engages or disengages the clamp arm. An alignment tongue and groove feature, described in detail below, may prevent such a force from skewing the drive wheel attached to the clamp arm relative to the other drive wheel.

Figure 1:
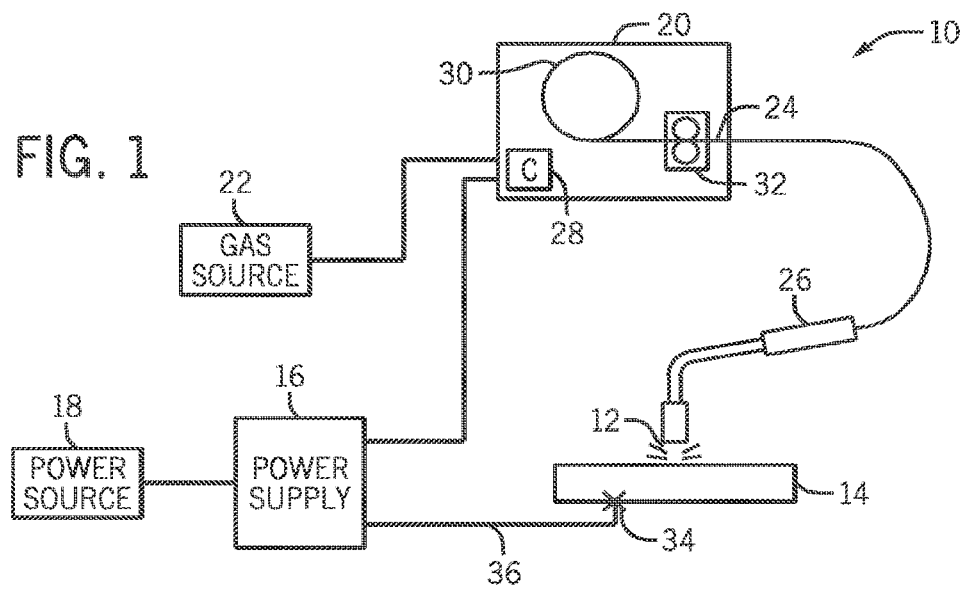
FIG. 1 is a block diagram of an embodiment of a welding system utilizing a wire feeder with an improved clamp arm configuration.

FIG. 1 is a block diagram of an embodiment of a welding system 10 in accordance with present techniques. The welding system 10 is designed to produce a welding arc 12 on a work piece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding wire 24 is fed through the welding torch 26 to the welding arc 12, molten by the welding arc 12, and deposited on the work piece 14.

The wire feeder 20 will typically include control circuitry, illustrated generally by reference numeral 28, which regulates the feed of the welding wire 24 from a spool 30, and commands the output of the power supply 16. The spool 30 will contain a length of welding wire 24 that is consumed during the welding operation. The welding wire 24 is advanced by a wire drive assembly 32, typically through the use of an electric motor under the control of the control circuitry 28. In addition, the work piece 14 is coupled to the power supply 16 by a clamp 34 connected to a work cable 36 to complete an electrical circuit when the electric arc 12 is established between the welding torch 26 and the work piece 14.

Placement of the welding torch 26 at a location proximate to the work piece 14 allows electrical current, which is provided by the power supply 16 and routed to the welding torch 26, to arc from the welding torch 26 to the work piece 14. As described above, this arcing completes an electrical circuit that includes the power supply 16, the welding torch 26, the work piece 14, and the work cable 36. Particularly, in operation, electrical current passes from the power supply 16, to the welding torch 26, to the work piece 14, which is typically grounded back to the power supply 16. The arcing generates a relatively large amount of heat that causes part of the work piece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Figure 2:
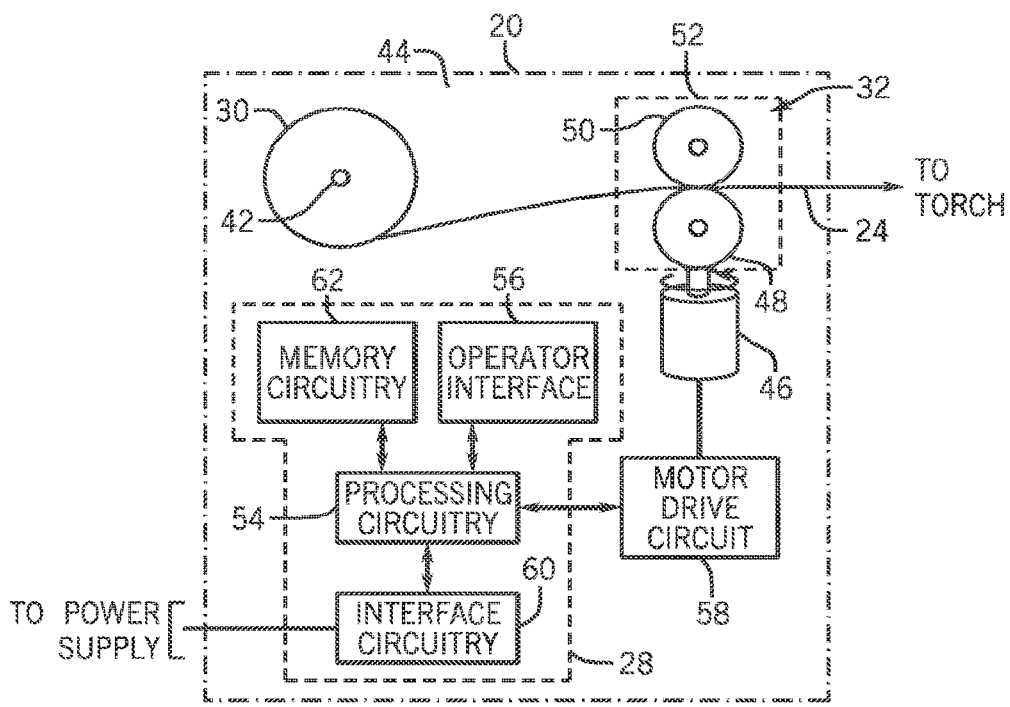
FIG. 2 is a block diagram of an embodiment of certain components of the wire feeder of FIG. 1.

FIG. 2 is a block diagram of an embodiment of certain components of the wire feeder 20 of FIG. 1. As previously described, the welding wire 24 is supplied from the spool 30, which may be mounted via a spool mount 42 onto an inner wall 44 of the wire feeder 20. The drive assembly 32 facilitates progressive feeding of the welding wire 24 from the spool 30 to the welding torch 26 at a desired rate for the welding application. A feed motor 46 is provided that engages with drive wheels 48, 50 to push the welding wire 24 from the wire feeder 20 toward the welding torch 26. In practice, one of the drive wheels (i.e., a driven drive wheel) 48 is mechanically coupled to the feed motor 46 and is rotated by the motor 46 to drive the welding wire 24 from the wire feeder 20, while the mating wheel (i.e., an idler drive wheel) 50 is biased toward the welding wire 24 to maintain contact between the two drive wheels 48, 50 and the welding wire 24. The drive wheels 48, 50 may be supported in a welding drive assembly housing 52, which may be attached to the inner wall 44 of the wire feeder 20. Both the first drive wheel 48 and the second drive wheel 50 are configured to rotate with respect to the assembly housing 52. The illustrated embodiment shows one pair of drive wheels 48, 50, however some wire feeders 20 may include multiple pairs of such drive wheels.

In addition to mechanical components, the wire feeder 20 also includes the control circuitry 28 for controlling the feed rate of welding wire 24 through the wire feeder 20, among other things. In certain embodiments, processing circuitry 54 is coupled to an operator interface 56 on the wire feeder 20 that allows selection of one or more welding parameters, for example, wire feed speed. The operator interface 56 may also allow for selection of such weld parameters as the welding process, the type of welding wire 24 utilized, current, voltage or power settings, and so forth. The processing circuitry 54 communicates with the feed motor 46 via a motor drive circuit 58, allowing control of wire feed speeds in accordance with operator selections. Additionally, the processing circuitry 54 permits these settings to be fed back to the power supply 16 via interface circuitry 60 and/or stored by appropriate memory circuitry 62 for later use. The control circuitry 28 within the wire feeder 20 may also regulate the flow of shielding gas from the gas source 22 to the welding torch 26. In general, such shielding gas is provided at the time of welding, and may be turned on immediately preceding welding and for a short time following welding.

Figure 3:
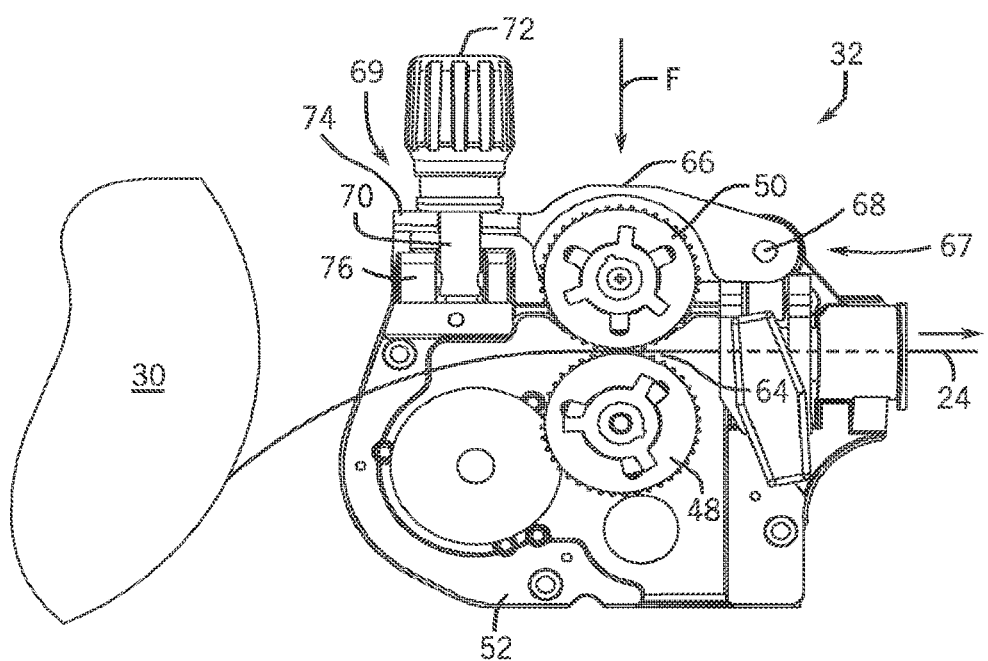
FIG. 3 is a front view of an embodiment of certain components of the wire feeder of FIG. 1, including a drive assembly feeding welding wire from a spool to a welding application.

FIG. 3 is a front view of an embodiment of certain components of the wire feeder 20 of FIG. 1, including the drive assembly 32 feeding welding wire 24 from the spool 30 to a welding application. As previously mentioned, the idler drive wheel 50 engages with the welding wire 24, applying a downward force F to the welding wire 24 for feeding the welding wire 24 between the drive wheels 48, 50. This downward force F generates traction between the drive wheels 48, 50 and the welding wire 24, effectively holding the welding wire 24 in alignment through a welding wire feed region 64 located between the drive wheels 48, 50. The welding wire feed region 64 may be defined by grooves formed along the circumference of the drive wheels 48, 50, where the welding wire 24 is held between two aligned grooves, one on each drive wheel 48, 50. As illustrated, the idler wheel 50 is mounted on a clamp arm 66, which pivots about one end 67 at a pivot point 68 and may be forced downward at an opposite end 69 by a tensioner 70. The tensioner 70 may apply a desired amount of compressive force F to the clamp arm 66, pushing the idler drive wheel 50 toward the driven drive wheel 48. Adjustment of the compressive force F applied by the tensioner 70 may alter the size of the wire feed region 64 between the grooves, and the desired compressive force F may be determined based on the diameter and material properties of the welding wire 24 (e.g., steel versus aluminum welding wire).

Initial insertion of the welding wire 24 into the welding wire feed region 64 between the drive wheels 48, 50 may be facilitated by pivoting the clamp arm 66, with the attached idler drive wheel 50, about the pivot point 68, thereby lifting the idler drive wheel 50 away from the driven drive wheel 48. Once the welding wire 24 is positioned in a desired alignment between the drive wheels 48, 50, the tensioner 70 may be engaged with the clamp arm 66, and the amount of force F placed on the clamp arm 66 by the tensioner 70 may be adjusted via an adjustment knob 72 of the tensioner 70. An operator may turn the adjustment knob 72 to compress or release a spring (not shown) in the tensioner 70, which increases or decreases the force applied to the clamp arm 66.

In addition to applying an appropriate downward force F to the clamp arm 66, the tensioner 70 may be pivoted out of engagement with the clamp arm 66, thus freeing the clamp arm 66 to pivot about its pivot point 68 and lift the idler drive wheel 50 away from the driven drive wheel 48. The illustrated embodiment of the drive assembly 32 features a tensioner 70 configured to pivot in a plane generally perpendicular to the direction of the welding wire 24 feeding through the drive assembly 32. The tensioner 70 may be configured to pivot about the tensioner joint in other planes, for example, in a plane generally parallel to the direction of the welding wire 24 feeding through the drive assembly 32. However, the illustrated arrangement may allow a relatively lengthy tensioner 70 to be pivoted out of engagement with the clamp arm 66 without contacting the spool 30. Such a lengthy tensioner 70 may provide a relatively long moment arm, allowing an operator to engage the tensioner 70 with the clamp arm 66 using less force than the operator would use to engage a relatively shorter tensioner 70. The illustrated configuration of the tensioner 70, being designed to pivot in a plane generally perpendicular to the direction of the welding wire 24 feeding through the drive assembly 32, may be especially beneficial for relatively compact wire feeders 20. That is, the spool 30 may be mounted fairly close to the drive assembly 32 since the tensioner 70, which may be relatively long, is configured to pivot in a direction that reduces possible interference with the spool 30.

As the tensioner 70 is pivoted into engagement with the clamp arm 66, a lateral force may be applied to the clamp arm 66. Certain alignment features may be desirable for reducing displacement of the clamp arm 66 relative to the assembly housing 52 caused by the lateral force. These alignment features may include an alignment tongue 74 extending from the end 69 of the clamp arm 66 opposite the pivot point 68 and a corresponding alignment groove 76 in the assembly housing 52. The alignment groove 76 may receive the alignment tongue 74 when the clamp arm 66 is lowered so that, when the tensioner 70 is engaged, a lateral force placed on the clamp arm 66 may not skew the clamp arm 66 out of alignment with the assembly housing 52. In addition, the alignment tongue 74 and groove 76 may limit lateral movement of the clamp arm 66 relative to pivoting motion of the clamp arm 66 about the pivot point 68. By maintaining the alignment of the clamp arm 66 with the assembly housing 52, the alignment tongue 74 and groove 76 may also maintain alignment of the welding wire 24 within the welding wire feed region 64 between the drive wheels 48, 50.

FIG. 4 is an exploded perspective view of an embodiment of the drive assembly 32 including the assembly housing 52 with mounted drive wheel 48, the clamp arm 66 with mounted drive wheel 50, and the tensioner 70. As previously mentioned, the clamp arm 66 may be connected with the assembly housing 52 at a pivot point 68, allowing the clamp arm 66 to pivot about the pivot point 68 relative to the assembly housing 52, thereby lifting or lowering the idler drive wheel 50 relative to the driven drive wheel 48. The clamp arm 66 may be rotationally coupled to the assembly housing 52 via a pin (not shown) placed through apertures 78 in a clamp arm joint 80 of the assembly housing 52. However, other arrangements of a hinged or rotational connection between the clamp arm 66 and a clamp arm joint 80 are possible, as will be apparent to those skilled in the art.

A similar connection may be used to couple the tensioner 70 with the assembly housing 52. For example, an aperture 82 formed through the tensioner 70 may receive a pin (not shown) configured to be received by apertures 84 through a tensioner joint 86 of the assembly housing 52. That is, a connection formed between the tensioner 70 and the assembly housing 52 may allow the tensioner 70 to be pivoted into engagement with the clamp arm 66, applying a compressive force F to the clamp arm 66 and, therefore, to the welding wire 24 between the drive wheels 48, 50. A tensioner groove 88 in the clamp arm 66 provides a path for the tensioner 70 to pivot for engagement or disengagement with the clamp arm 66. The illustrated embodiment shows the tensioner groove 88, tensioner joint 86, and apertures 82 and 84 configured to facilitate rotation of the tensioner 70 in a plane that is substantially perpendicular to the direction of the welding wire 24 feeding through the drive assembly 32. Different arrangements of these features may be possible as well. For example, the tensioner 70 may be rotationally coupled with the assembly housing 52 using a different type of hinged connection. In addition, the tensioner 70, tensioner joint 86, and tensioner groove 88 may be configured such that the tensioner 70 pivots in a different plane. However, the illustrated arrangement of these features may allow a relatively longer tensioner 70 to pivot in a direction that minimizes undesirable interactions of the tensioner 70 with the spool 30, affording greater mechanical advantage to an operator.

As introduced in FIG. 3, the drive assembly 32 of FIG. 4 includes an alignment tongue 74 extending downward from the end 69 of the clamp arm 66 and a corresponding groove 76 in the assembly housing 52. In the illustrated embodiment, the tongue 74 is substantially rectangular shaped, configured to fit securely into the rectangular shaped groove 76. However, other shapes and configurations of the tongue 74 and groove 76 may be desirable. For example, the clamp arm 66 of the drive assembly 32 may feature a tapered tongue extending toward a corresponding groove formed within the assembly housing 52. For further example, the clamp arm 66 may feature a groove designed to receive a corresponding tongue extending from the assembly housing 52. In addition, multiple tongue and groove features may be added to the clamp arm 66 and/or assembly housing 52 to increasingly mitigate any lateral movement of the clamp arm 66 in response to the force used to engage the tensioner 70. Still further, the tensioner 70 may be configured to rotate about a different axis than that shown in the illustrated embodiment (e.g., parallel to the axis of rotation of the clamp arm 66 about the pivot point 68). In this case, one or more tongue and groove connections may be positioned along a different edge of the clamp arm 66 and/or assembly housing 52.

FIG. 5 is a side view of an embodiment of the drive assembly 32 including the tensioner 70 pivoting into engagement with the clamp arm 66. In a disengaged position 92, the tensioner 70 places no compressive force on the clamp arm 66, and the welding wire feed region 64 between the drive wheels 48, 50 may be relatively open for the welding wire 24 to be positioned therein. Further, the welding wire 24 may be positioned within grooves 94, 96 located along the circumference of drive wheels 48, 50, respectively. Once the welding wire 24 is positioned between the grooves 94, 96, the tensioner 70 may be moved into an engaged position 98, as indicated by arrow 100. Before the tensioner 70 is moved into this engaged position 98, the clamp arm 66 is rotated such that the drive wheel 50 mounted on the clamp arm 66 contacts the drive wheel 48 mounted on the assembly housing 52 and the alignment tongue 74 is positioned in the alignment groove 76.

As an operator uses the appropriate force to move the tensioner 70 into the engaged position 98, the tensioner 70 may transfer a lateral force to the clamp arm 66 in the direction defined by arrow 102. The alignment tongue 74 of the clamp arm 66 secured within the alignment groove 76 of the assembly housing 52 may significantly reduce any displacement of the clamp arm 66 in the direction of arrow 102 due to the lateral force. Consequently, the idler drive wheel 50 mounted on the clamp arm 66 may not be displaced relative to the drive wheel 48 mounted on the assembly housing 52 as the tensioner 70 is engaged. Therefore, alignment of the grooves 94, 96 may be maintained so the welding wire 24 stays in place as the tensioner 70 is pivoted into engagement. The alignment tongue 74 of the clamp arm 66 and the alignment groove 76 of the assembly housing 52 may also reduce the risk of misaligning the welding wire 24 between the grooves 94, 96 as the tensioner 70 is maneuvered from the engaged position 98 to the disengaged position 92. Due to the presence of the alignment tongue 74 and alignment groove 76 between the clamp arm 66 and the assembly housing 52, the movement of the tensioner 70, to or from the engaged position 98, may reduce the risk of skewing the clamp arm 66 relative to the assembly housing 52, the idler drive wheel 50 relative to the driven drive wheel 48, and the groove 94 relative to the opposite groove 96, maintaining alignment of the welding wire 24 in the drive assembly 32.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   rotating a clamp arm of a welding wire feeder from a first position to a second position about a clamp arm joint formed with a housing of the welding wire feeder, a first drive wheel being mounted to the clamp arm, and a second drive wheel being mounted to the housing;
   positioning a tensioner in a first tensioner groove of the housing, the first tensioner groove being adjacent an alignment groove of the housing; and
   pivoting the tensioner into a second tensioner groove in the clamp arm, the second tensioner groove being aligned with the first tensioner groove when the clamp arm is in the second position,
      wherein an alignment tongue of the clamp arm is received within the alignment groove of the housing when the clamp arm is in the second position, and
      wherein the reception of the alignment tongue in the alignment groove:
         restricts a pivoting force of the tensioner from moving the clamp arm laterally relative to a pivoting point of the tensioner and
         maintains an alignment of a welding wire as the tensioner is moved between the first tensioner groove and the second tensioner groove, and
      wherein the tensioner pivots in a plane perpendicular to a direction of the welding wire feeding through the housing.

2. The method of claim 1, further comprising adjusting an adjustment knob of the tensioner to apply a compressive force to the clamp arm and the first drive wheel.

3. The method of claim 1, further comprising rotating the first drive wheel and the second drive wheel relative to the housing to facilitate feeding of welding wire through a welding wire feed region between the first and second drive wheels.

4. The method of claim 3, wherein the second drive wheel rotates about a wheel axis and pivoting the tensioner comprises pivoting the tensioner about a tensioner axis approximately perpendicular to the wheel axis.

5. The method of claim 4, wherein pivoting the tensioner comprises pivoting the tensioner about a tensioner joint formed with the housing, wherein the tensioner axis extends through the tensioner joint.

6. The method of claim 1, wherein the alignment groove is at least partly defined by a wall of the housing, and wherein the second tensioner groove is also at least partly defined by the wall.

7. The method of claim 1, wherein the clamp arm comprises a first end and a second end, wherein the alignment tongue extends from the first end and the clamp arm forms the clamp arm joint with the housing at the second end.

8. A welding wire feeder, comprising:
   a housing comprising a first tensioner groove adjacent to an alignment groove;
   a first drive wheel configured to rotate with respect to the housing;
   a second drive wheel configured to rotate with respect to the housing, wherein the first and second drive wheel are disposed opposite from one another across a welding wire feed region;
   a tensioner configured to pivot about a tensioner joint of the housing; and
   a clamp arm configured to rotate about a clamp arm joint of the housing, the clamp arm comprising a second tensioner groove configured to align with the first tensioner groove and to receive the tensioner, the clamp arm further comprising an alignment tongue extending from the clamp arm,
   wherein the alignment groove is configured to:
      receive the alignment tongue and restrict lateral movement of the clamp arm relative to the tensioner joint when the alignment tongue is received in the alignment groove and
      maintain an alignment of a welding wire as the tensioner is moved between the first tensioner groove and the second tensioner groove, and
   wherein the tensioner pivots in a plane perpendicular to a direction of the welding wire feeding through the housing.

9. The welding wire feeder of claim 8, wherein the clamp arm is configured to transfer a compressive force from the first drive wheel to a welding wire fed through the welding wire feed region.

10. The welding wire feeder of claim 9, wherein the tensioner comprises an adjustment knob configured to adjust the compressive force transferred from the clamp arm when the tensioner is disposed within the second tensioner groove.

11. The welding wire feeder of claim 8, wherein the first drive wheel is mounted to the clamp arm and the second drive wheel is mounted to the housing.

12. The welding wire feeder of claim 8, wherein the clamp arm is configured to rotate about a clamp axis extending through the clamp joint, wherein the first drive wheel is configured to pivot about a wheel axis, and wherein the clamp axis is parallel to the wheel axis.

13. The welding wire feeder of claim 8, wherein the clamp arm comprises a first end and a second end, wherein the alignment tongue extends from the first end and the clamp arm forms the clamp arm joint with the housing at the second end.

14. The welding wire feeder of claim 8, wherein the alignment groove is at least partly defined by a wall of the housing, and wherein the second tensioner groove is also at least partly defined by the wall.

15. A welding system, comprising:

a welding wire spool;

a wire feeder housing configured to feed welding wire from the welding wire spool through a wire feed region of the wire feeder housing, the wire feeder housing comprising a first tensioner groove adjacent to an alignment groove;

a first drive wheel configured to rotate with respect to the wire feeder housing;

a second drive wheel configured to rotate with respect to the wire feeder housing, wherein the first and second drive wheel are disposed opposite from one another across the wire feed region;

a tensioner configured to pivot about a tensioner joint of the wire feeder housing; and a clamp arm configured to rotate about a clamp arm joint of the wire feeder housing, the clamp arm comprising a second tensioner groove configured to align with the first tensioner groove and to receive the tensioner, and the clamp arm further comprising an alignment tongue extending from the clamp arm, wherein the alignment groove is configured to:
    receive the alignment tongue and restrict lateral movement of the clamp arm relative to the tensioner joint when the alignment tongue is received in the alignment groove and
    maintain an alignment of a welding wire as the tensioner is moved between the first tensioner groove and the second tensioner groove, and
wherein the tensioner pivots in a plane perpendicular to a direction of the welding wire feeding through the wire feeder housing.

16. The welding system of claim 15, wherein the clamp arm is configured to transfer a compressive force from the first drive wheel to a welding wire fed through the welding wire feed region.

17. The welding system of claim 16, wherein the tensioner comprises an adjustment knob configured to adjust the compressive force transferred from the clamp arm when the tensioner is disposed within the second tensioner groove.

18. The welding system of claim 15, wherein the first drive wheel is mounted to the clamp arm and the second drive wheel is mounted to the wire feeder housing.

19. The welding system of claim 15, wherein the clamp arm is configured to rotate about a clamp axis extending through the clamp joint, wherein the first drive wheel is configured to pivot about a wheel axis, and wherein the clamp axis is parallel to the wheel axis.

20. The welding system of claim 15, wherein the clamp arm comprises a first end and a second end, wherein the alignment tongue extends from the first end and the clamp arm forms the clamp arm joint with the wire feeder housing at the second end.

* * * * *